United States Patent [19]
Padawer et al.

[11] Patent Number: 5,484,121
[45] Date of Patent: Jan. 16, 1996

[54] ICING DETECTOR FOR AIRCRAFT SURFACES

[76] Inventors: Jacques Padawer, 170 Villard Ave., Hastings-on-Hudson, N.Y. 10706; Robert M. Goldberg, 120 Orleans La., Jericho, N.Y. 11753

[21] Appl. No.: 151,181

[22] Filed: Nov. 12, 1993

[51] Int. Cl.⁶ .................................................. B64D 15/20
[52] U.S. Cl. ........................................ 244/134 F; 340/583
[58] Field of Search ............................ 244/134 R, 134 F; 340/583, 962, 581; 73/170 R; 364/563

[56] References Cited

U.S. PATENT DOCUMENTS

| | | | |
|---|---|---|---|
| 2,359,787 | 10/1944 | Peters et al. | 340/583 |
| 3,540,025 | 11/1970 | Levin et al. | 340/583 |
| 4,766,369 | 8/1988 | Weinstein | 340/580 |
| 4,782,331 | 11/1988 | Fineman | 340/583 |
| 4,797,660 | 1/1989 | Rein | 340/580 |
| 4,803,470 | 2/1989 | Fineman | 340/583 |
| 4,851,817 | 7/1989 | Brossia et al. | 340/583 |
| 5,014,042 | 5/1991 | Michoud et al. | 340/580 |
| 5,218,206 | 6/1993 | Schmitt et al. | 340/583 |
| 5,243,185 | 9/1993 | Blackwood | 340/583 |
| 5,296,853 | 3/1994 | Federow et al. | 340/583 |

FOREIGN PATENT DOCUMENTS 2568907  2/1986  France .................................. 340/583

OTHER PUBLICATIONS

"Autonomous Deicing System for Airplane Wing" LEW–15376, NASA Tech Briefs.
FAA Advisory Circular AC120–58, Sep. 30, 1992 US DOT Utility and Storage Section.

*Primary Examiner*—Galen L. Barefoot

[57] ABSTRACT

A safety system for detecting ice on the external surfaces of aircraft that are awaiting take-off from airports is disclosed. Multiple optical sensors mounted flush with the craft skin emit coded radiation signals away from the craft's skin. If a layer of ice is present on a sensor, light is reflected back to a corresponding detector, generating an electrical signal. Reflection from water or antifreeze or from environmental or endogenous noise yield distorted signals that are rejected by the code-reading circuitry. Relevant signals are sent to the cockpit, where the location of the ice on the aircraft is displayed for the crew, as well as to the airport tower via standard communication link, and to the flight data recorder. The invention assures that ice is detected at all critical times while the craft proceeds from the terminal to when it is airborne. Visual and audible alarms inform the pilot if unacceptable conditions prevail.

10 Claims, 4 Drawing Sheets

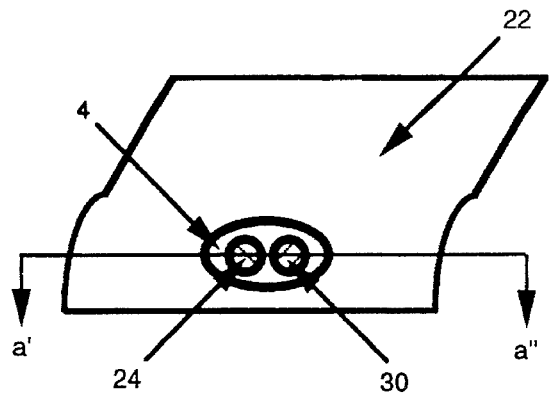
Fig. 2a) icing sensor
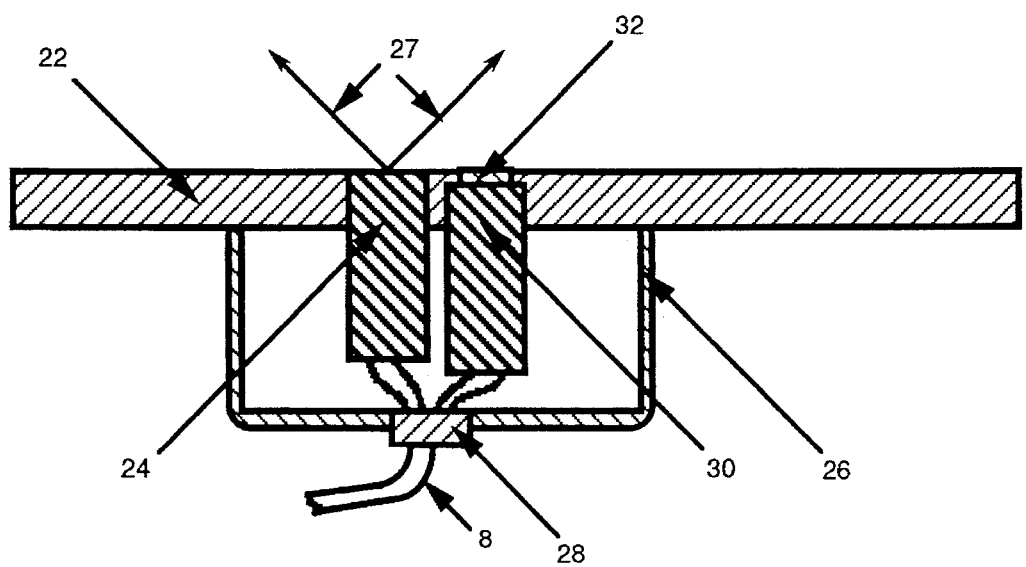
Fig. 2b) section a' - a"  no ice on sensor
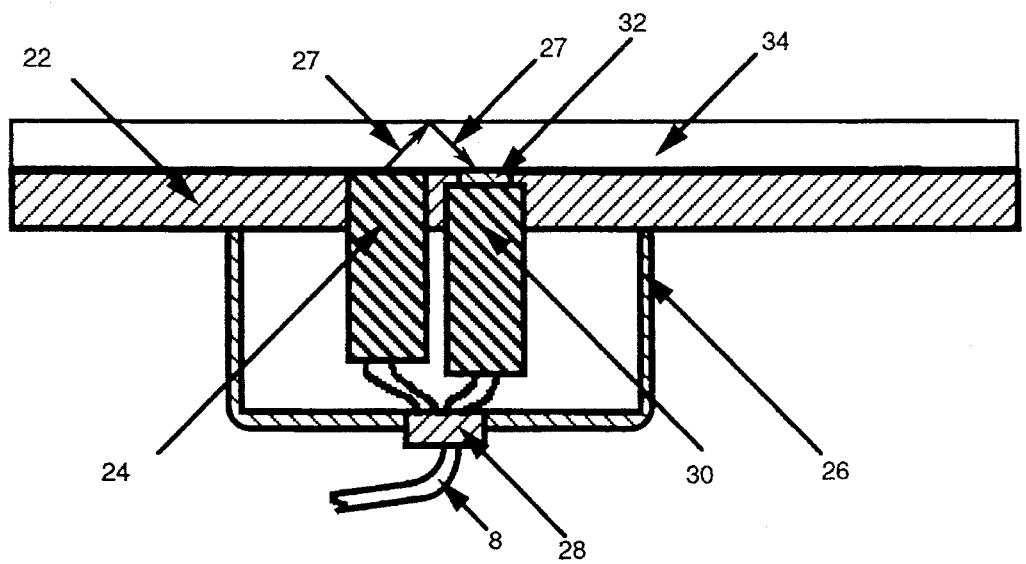
Fig. 2c) section a' - a"  with ice on sensor

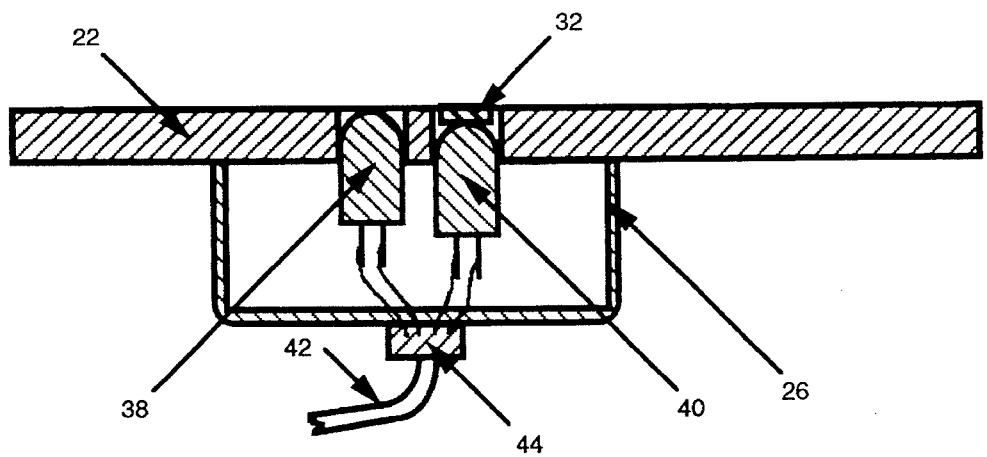
Fig. 3a) sensor with semiconductor elements
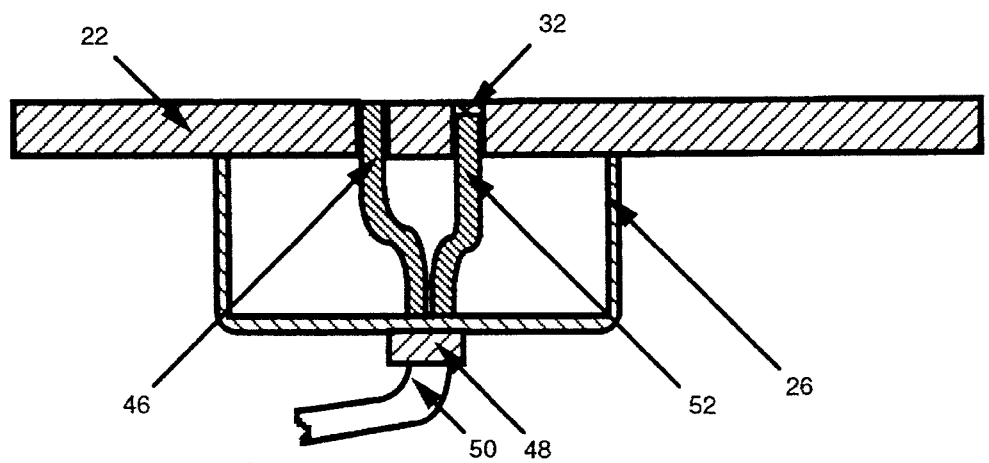
Fig. 3b) sensor with optical fiber elements
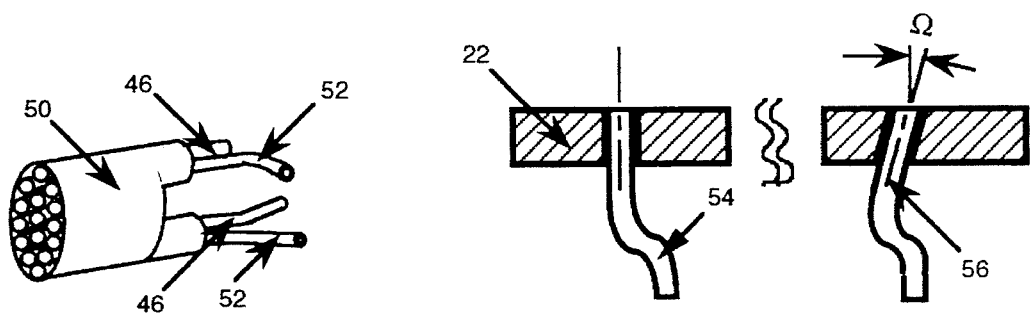
Fig. 3c) distribution cable to several sensors
Fig. 3d) optical fiber sensor element at offset angle, $\Omega$
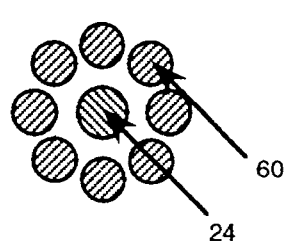
Fig. 3e) annulus of discrete detector elements
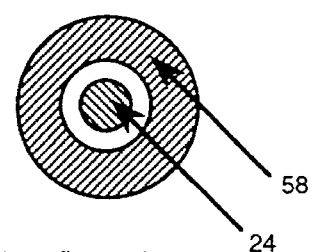
Fig. 3f) continuous annular detector element

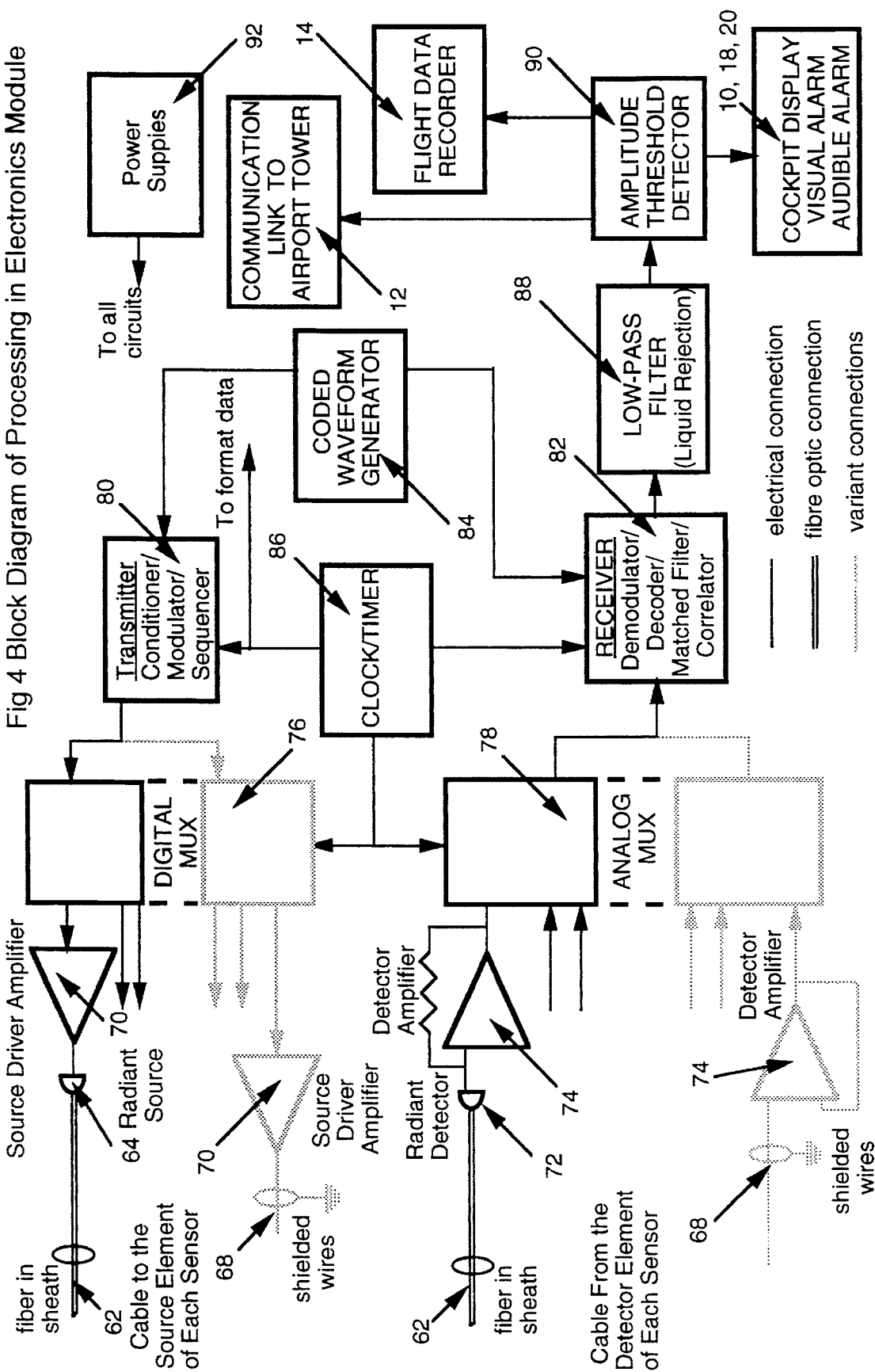
Fig 4 Block Diagram of Processing in Electronics Module

ICING DETECTOR FOR AIRCRAFT SURFACES

BACKGROUND FIELD OF INVENTION

This invention deals with the prevention of aircraft accidents that presently occur on takeoff because of an undetected buildup of ice on external surfaces. A tragic accident took place at LaGuardia Airport in New York on Mar. 22, 1992, when USAir Flight 405 crashed into the water, killing 27 people. Investigation determined that a thin layer of ice had formed during takeoff, reducing lift and control. Other accidents have been attributed to ice buildup: in Washington, D.C. some years ago; in Canada, in 1989; among others.

BACKGROUND DESCRIPTION OF PRIOR ART

Aircraft that need to operate in cold weather have systems to defog and deice their external surfaces while in-flight. The in-flight deicing systems are not effective while aircraft are on the ground and awaiting takeoff. Current practice at airports is to allocate a dedicated area of runway where equipment for deicing aircraft prior to takeoff is available. The equipment is capable of spraying large amounts of a viscous anti-freeze solution over the entire external surface of an aircraft and removing all the ice present. Unfortunately, ice may form again, between de-icing and takeoff. Detection of ice is currently left to members of the crew, by visual inspection. The desirability of having better means to detect ice on external surfaces is clear. Robotic Vision Systems, Hauppague, N.Y., has described a system for ensuring that the spray de-icing procedure is complete, but ice may again form on the craft, unbeknown to the crew, while it is taxying to the take-off area. A different approach, described by the Lewis Research Center, Cleveland, Ohio, claims to detect ice with electromechanical sensors located in the wings and to remove ice automatically by inducing impulses with electromechanical transducers.

OBJECTS AND ADVANTAGES

A major object of the present invention is to prevent aircraft accidents on takeoff that are due to the formation of ice on external surfaces.

Another object is to detect ice on the external surfaces of aircraft awaiting takeoff.

Yet another object is to alert the aircraft crew and airport officials to the presence of ice.

BRIEF DESCRIPTION OF THE DRAWINGS

FIG. 2(a–c) Structure of the sensors.

FIG. 3(a–f) Alternative embodiments of the sensor element.

FIG. 4 Block diagram of signal processing in the electronics module

SUMMARY

Figure 1:
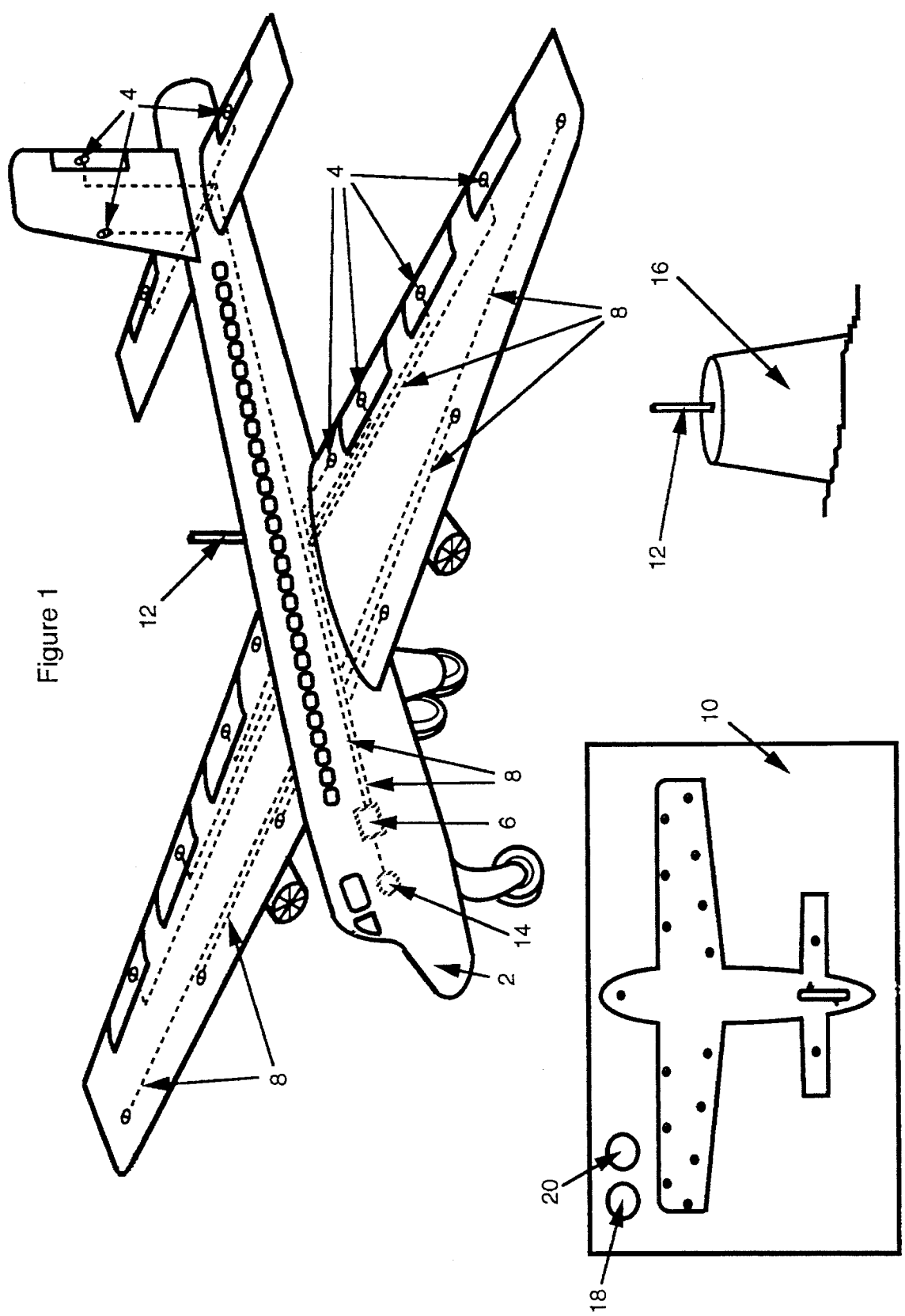
FIG. 1 Overview of the system to detect the buildup of ice on the external surface of an aircraft.

This invention provides a safety system to detect ice on the external surfaces of aircraft that are on the ground and waiting to take-off. Ice is sensed with a plurality of sensors that are located at suitable positions in the body of the aircraft and mounted flush with its surface. The presence of an ice buildup, on any sensor, generates a signal that is sent to the cockpit, where its location on the aircraft is displayed for the crew and to the airport tower, where it is available to traffic control officials.

NARRATIVE DESCRIPTION OF STRUCTURE

FIG. 1 shows an aircraft, 2, with the icing detection system installed. A plurality of sensors, 4, mounted at points about the surface of the aircraft, are each connected, by cable, 8, to the electronics module, 6. Output data from the electronics module are sent to a display, 10, in the cockpit, to the flight log data recorder, 14, and also, to the airport control tower, 16, by way of a radio frequency communications link, 12.

FIG. 2a shows a plan view of a typical icing sensor, 4, mounted at the leading edge of a wing, 22. Other sensors may be similarly mounted in other critical surfaces, such as trailing edges of wings or ailerons, body of aircraft, or even protruding elements, such as antennae, radar dome, etc. FIGS. 2b and 2c show cross sectional views along line $a'$–$a''$ of FIG. 2a, without and with ice covering the surface, respectively.

As seen in FIG. 2a, each sensor is flush mounted within the skin of the aircraft, 22, and is capable of being polled and producing signal that determines whether ice overlies its field of view. The sensors, 4, are of an active type and consist of the elements shown in FIG. 2a. The radiant source element, 24, has its principal axis pointed away from the aircraft's surface and emits a beam of radiant energy. The energy might be in either the visible or invisible portions of the electromagnetic spectrum. The radiant detector element, 30, has its sensitive area directed outward from the aircraft's surface, 22, and responds strongly to the radiant energy emitted by the source element. The source and detector are mounted a small distance apart and may have their principal axes tilted slightly toward each other. A wavelength filter, 32, covers the sensitive area of the detector, 30, and only passes energy that corresponds to those radiant wavelengths produced by the source. Signals to and from the sensor elements pass through a connector, 28, and are connected to a cable, 8, that carries signals to and from the electronics module, 6. The sensor is enclosed by housing, 26.

The icing sensor, 4, may take either of the two variant forms illustrated in FIGS. 3a or 3b. In the first version, shown in FIG. 3a, the source element is a radiation emitting semiconductor diode, 38, and the detector element, 40, is a radiation detecting semiconductor diode that are wired through the electric connector, 44, to the shielded cable, 42. In the second version, shown in FIG. 3b, the source element, 46, and the detector element, 52, are the ends of optical fibers that pass through fiberoptic connector, 48, to cable, 50. The ends of the optical fiber of the sensor elements may be normal to the skin of the aircraft, 22, as is element 54, or be set at an angle $\Omega$, by a polished bias at the end of the fiber, as is element 56, as shown in FIG. 3d.

The connecting cable, 8, from each sensor may run directly, point-to-point, to the electronics module, 6, or the shielded wires (FIG. 3a) or optical fibers (FIG. 3b) may join into a larger cable, as shown in FIG. 3c.

The efficiency of detected energy collection in the sensor can be greatly increased by using a detector element that fills an annular space centered on the source element. Two variant forms are illustrated in FIGS. 3e and 3f. In the first case, shown in FIG. 3e, a number of discrete detector elements, 60, are placed in a circle about the source, 24. In the second case, shown in FIG. 3f, the detector element, 58, is continuous and also placed concentric about the source element, 24. In either of these cases, the detector element can be an active diode device or an optical fiber. In the case of FIG. 3f, continuous annular elements are not standard, and would need to be specially formed.

The icing detection system may be incorporated into new aircraft or can be retrofit into existing aircraft. In the latter case, installation of the fiber optic cable, between sensor elements, 4, and the electronics module, 6, can be performed in the usual manner by snaking cable through existing utility channels in the existing aircraft structure. A significantly less expensive and more expeditious installation method involves bonding cable to the external surfaces of the aircraft with a suitable adhesive material. With suitably sheathed fiber, cable runs between sensors or between sensor and electronics module could be made quickly and reliably. Fiberoptic cable is extremely thin and would not significantly affect the aircraft's aerodynamic properties. Alternately, the wires or optical fibers could be imbedded in tape adhered to the external skin of the craft.

The sensors, 4, located in the external surface of the aircraft, 2, are each connected to the electronics module, 6, by either fiberoptic or electrical cable, 8, as previously mentioned. The signal processing that is performed in the electronics module is illustrated by the block diagram in FIG. 4.

Clock/timer, 86, is used to form signals in the coded wave form generator, 84, to index the multiplexes, 76 and 78, as required, and to control the signal processing cycle. The coded wave form signal is applied to both the transmitter, 80, and the receiver, 82. The transmitter develops and applies signal to the digital multiplex, 76, which, in turn, applies signal to each source driver amplifier, 70, and then, to each radiant source, 64. The radiant energy produced by these sources is applied to an optical fiber, 62, and carried by cable, 62, to the variant form of sensor shown in FIG. 3b. The alternate digital multiplex (indicated as a phantom in gray) take the signal from the transmitter, 80, and applies it, in turn, to the source driver amplifiers, 70, to the shielded electric wires, 68, to cable, 42, and is applied to the variant sensors shown in FIG. 3a.

The energy emitted, from each sensor source element, 24, that is reflected onto a corresponding sensor source element, 30, produces signal that is carried by cable, 8, back to the electronics module, 6. In the case of the variant form of sensor shown in FIG. 3a, connection is made to the analog multiplex, 78, by electric wires, 68, and detector amplifiers, 74. The analog multiplex, 78, sequences signal from each sensor, in turn, to the receiver, 82. In the case of the variant form shown in FIG. 3b (shown in phantom in gray) connection is made to the analog multiplex, 78, by shielded wire, 68, and detector amplifier, 74. The receiver, 82, uses the coded wave form to process, in turn, signal in the presence of noise. This processing might be a matched filter or correlator, as is commonly known to those familiar in the art. The receiver is connected to low pass filter, 88, which enhances desired signals before a logical decision is made by the amplitude threshold detector, 90.

The digital signal developed by the amplitude threshold detector, together with sensor identification data from clock/timer, 86, is sent to: the aircraft flight recorder, 14; to the communication link with the airport tower, 12; and to the cockpit, where it is applied to a display, 10, with visual, 18, and audible, 20, alarms. The display, 10, alerts crew to the icing condition and may further indicate which sensor is icing (location on the airframe.)

Power supplies, 92, provide DC voltages to all the circuits in the electronics module, 6, and also provide power for the sources and detectors in the icing sensors, 4.

Explanation of How it Works

This invention makes use of the phenomenon of reflection of radiation at the interface between two translucent media with different transmission properties. In this case, the media are air and ice, if it is present. FIGS. 2b and 2c show the path of radiant energy, 27, from the sensor radiant source element, 24, in the absence of ice and when ice covers the sensor, respectively. In FIG. 2b there is no ice covering the sensor, and all of the radiation emitted by the source sensor element, 24, is directed away from the surface. In FIG. 2c, ice, 34, is present and a significant portion of the radiation is reflected or multiply reflected onto the detector element, 32. An electrical signal is generated by the detector, that when properly processed in the electronics module, 6, to suppress noise and to reduce extraneous signals, coherent and incoherent, will indicate the formation of ice at that sensor location.

The processing in the electronics module is shown in FIG. 4 and is similar to that of a radar, or other ranging system. Energy is transmitted, a tuned and matched receiver detects reflected energy from a target, and processing eliminates noise and distinguishes between clutter and a desired and undesired target.

The system takes into account several factors which confound ideal measurement conditions. These include: incident sunlight or other radiant sources that may be present and reach the sensor detector element; other reflecting materials, including liquids (e.g., water or antifreeze) in the field of view of the sensor; electrical noise entering the system.

The block diagram in FIG. 4 shows the elements of signal processing in the electronics module, 6. The processing ensures that only specific signals, that conform to the transmitted coded wave form and that arise from light emitted by the sensor source element, 24, in FIG. 2c, and that are reflected from a solid material such as ice, 36, onto the sensor detector element, 30, are significant in determining the logical output from the threshold detector circuit, 330. Other undesired electrical interference: either due to other radiant sources, such as, directly incident or reflected sunlight or artificial lamps, as well as signal arising from radiation emitted by the sensor source element and reflected onto the sensor detector element from liquids, such as water or antifreeze, as well as ambient electrical noise, must be attenuated to negligible levels in comparison with signals developed from the reflections of a solid material like ice.

Shielded, multi-conductor electric wire, 68, can be used to connect the source driver amplifiers, 70, and the detector amplifiers, 74, circuits in the electronics module. with the sensors elements, 24 and 30, mounted in the skin of the aircraft. In the case of the alternative sensor variant forms, where radiant signals are connected between sensors and the electronics module with optical fiber, 62, ambient electrical noise can be effectively eliminated from the sensor receiver, 82.

A narrow band radiation filter, 32, as shown in FIG. 2b, covers the detector and greatly attenuates any incident radiation that is not close to the wavelength of the radiant source element of the sensor, 24. The coded wave form generator, 84, produces a signal for the radiant source drivers that is also used in the receiver, 82, processing circuitry to maximize discrimination between any signal due to random radiant sources in the field of view of the sensor or to electrical noise entering the system.

Reflections from liquids, (e.g., rain or melting snow) antifreeze, or other liquid clinging to the aircraft surface, will produce reflections that are coherent with respect to the transmitted source emission and might be detected and misread as due to ice buildup. Their signal content, however, will include components shifted in frequency above those of the radiated source energy reflected from a solid material, such as ice. In the present invention these are discriminated against on the basis that, being subject to subject to vibrations of the aircraft due to wind forces and/or aircraft motion, they will not conform to the signal wave form imposed on the emitting source. A relatively long integration time or equivalent low-pass frequency response filter will attenuate varying signals due to reflections arising from mobile fluids rather than the steady ones reflected from solid ice.

When the amplitude threshold detector, 90, indicates ice is present, a signal is displayed in the cockpit, 10, which shows the location on the aircraft of the particular sensor(s). The timer/clock, 86, provides data corresponding to which sensor is active at any moment. The cockpit display, 10, can include a visual alarm, 18, and an audible alarm, 20. At the same time, the icing condition, as well as the time of day and the aircraft's identification, are transmitted to the airport control tower over an existing radio frequency communications link, 12, and are recorded in the aircraft flight recorder, 14.

Conclusion, Ramifications, Broadening

The system disclosed here can prevent accidents that currently result from icing on the surface of aircraft during take-off.

The equipment and methods for detecting the formation of ice on the external surface of aircraft can be applied in other, similar situations where there is concern for ice formation.

What we claim is:

1. A system for detecting the presence of ice on the external surfaces of an aircraft, comprised of:

a) a plurality of radiant sensors that are flush-mounted at convenient places in the external surface of the aircraft, each said radiant sensor consisting of the combination of a source element that can radiate energy normal to and away from the surface of the aircraft and an adjacent detector element which is sensitive to energy normal to and incident upon the surface of the aircraft, so that said radiant sensor can generate a signal when the fields of view of said source element and said detector element are mutually covered by a reflecting material;

b) an electronics module that is connected to said source element and said detector element of each of the radiant sensors, that generates a time-coded signal to control the emission of each source element, that processes the received signal from each detector element by correlating it with said time-coded signal and that develops a logical signal to indicate the presence or absence of a reflecting material at each radiant sensor; and c) an alarm unit located in the cockpit of the aircraft that is connected to said electronics module and that indicates the presence or absence of a reflecting material at each of the radiant sensors, such that when ice forms on any radiant sensor, radiant energy emitted from the source element and reflected from the ice onto the adjacent detector element will generate a logical signal and the presence of ice will be indicated by the alarm unit.

2. The radiant sensor in claim 1, where said detector element is covered by a wavelength-selective radiant filter that passes only radiant energy that corresponds to the energy emitted by the source element and blocks solar and other extraneous radiant energy.

3. The radiant sensor in claim 1, in which said source element is a radiation-emitting semiconductor diode, which is electrically connected to the electronics module.

4. The radiant sensor in claim 1, in which said detector element is a radiation-sensitive semiconductor diode, which is electrically connected to the electronics module.

5. The radiant sensor in claim 1, in which said source element is the end of a fiber optic cable, which extends through and is flush-mounted with the aircraft skin and which is connected to a radiant source located in said electronics module.

6. The radiant sensor in claim 1, in which said detector element is the end of a fiber optic cable, which extends through and is flush-mounted with the aircraft skin and which is connected to a radiation-sensitive detector located in said electronics module.

7. The electronics module in claim 1, where the processing of signals received from said detector elements comprises:

a) an amplifier and a signal correlator that uses said time-coded signal;

b) a low-pass filter with an effective cut-off frequency below that of coherent signals that are generated by liquid that may cover a radiant sensor and be subject to normal aircraft vibration and air turbulence; and c) an amplitude detector circuit at the output of said low-pass filter that is set to a threshold level that exceeds that of coherent signal components due to radiant energy reflected by any liquid that covers the radiant sensor and is subject to normal aircraft vibration and air turbulence;

such that the presence of a logical signal from said amplitude detector circuit will be due to the coherent energy emitted by the source element of a radiant sensor covered by ice and will not be due: to random noise, or to incoherent radiant sources incident on the detector element, or to coherent energy reflected by vibrating liquid that covers a radiant sensor.

8. The alarm unit in claim 1, which includes an audible signal that can alert crew members to the presence of a reflecting material on any radiant sensor.

9. The system in claim 1, with a communication multiplex unit that takes the logical data from said electronics module and transmits this, as well as identification for the aircraft, to the airport control tower.

10. The alarm unit in claim 1, where there are means to visually indicate locations on the aircraft where ice has formed.

* * * * *